US011496613B2

(12) United States Patent
Skolicki

(10) Patent No.: US 11,496,613 B2
(45) **Date of Patent: *Nov. 8, 2022**

(54) DETECTING USER INTEREST IN PRESENTED MEDIA ITEMS BY OBSERVING VOLUME CHANGE EVENTS

(71) Applicant: Google LLC, Mountain View, CA (US)

(72) Inventor: Zbigniew Skolicki, Cracow (PL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,776

(22) Filed: May 17, 2021

(65) Prior Publication Data

US 2021/0274026 A1 Sep. 2, 2021

Related U.S. Application Data

(63) Continuation of application No. 16/579,609, filed on Sep. 23, 2019, now Pat. No. 11,012,545, which is a (Continued)

(51) Int. Cl.
*H04L 12/24* (2006.01)
*H04L 41/0803* (2022.01)
(Continued)

(52) U.S. Cl.
CPC ............ *H04L 69/28* (2013.01); *H04L 67/535* (2022.05)

(58) Field of Classification Search
CPC ........ H04L 69/28; H04L 67/22; H04L 67/535
(Continued)

(56) References Cited

U.S. PATENT DOCUMENTS 8,112,456 B1 2/2012 Van Hoff et al.
2003/0088832 A1 5/2003 Agostinelli et al.
(Continued)

FOREIGN PATENT DOCUMENTS

CN 101385021 3/2009
CN 102696233 9/2012
(Continued)

OTHER PUBLICATIONS

Extended European Search Report dated Oct. 26, 2016 in EP Patent Application No. 14714015.6.
(Continued)

*Primary Examiner* — Yves Dalencourt
*Assistant Examiner* — Elizabeth Kassa
(74) *Attorney, Agent, or Firm* — Byrne Poh LLP

(57) ABSTRACT

An electronic device monitors audible output for media content being presented in its vicinity. It detects a volume change event within the monitored audible output. It obtains identification of the media content. Based on the identification, the device obtains a list of expected volume change events within the media content. It determines whether the detected volume change event correlates with one of the expected volume change events. In accordance with a determination that there is no correlation, the device determines that the detected volume change event comprises a volume change event from a user of the device. It analyzes the detected volume change event to determine user interest in the presented media content. The determined level of interest is sent to a server system. The device receives from the server system one or more recommendations based on the determined level of interest, and presents to the user the recommendations.

21 Claims, 6 Drawing Sheets

Detect a volume change event from a user of the client system for media content presented in the vicinity of the client system — 602

Recording the time associated with the detected volume change event in a timestamp — 604

Analyzing the volume change event to determine user interest in the presented media content — 606

Send the determined level of interest to a server system — 608

Receiving, from the server system, recommendations for additional media content based on the determined level of interest — 610

Related U.S. Application Data continuation of application No. 13/830,866, filed on Mar. 14, 2013, now Pat. No. 10,447,826.

(51) Int. Cl.
*H04L 69/28* (2022.01)
*H04L 67/50* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2004/0031045 | A1 | 4/2004 | Ivanyi | |
| 2005/0251437 | A1 | 11/2005 | Meuleman | |
| 2007/0283008 | A1 | 12/2007 | Bucher et al. | |
| 2008/0064351 | A1 | 3/2008 | Landschaft et al. | |
| 2008/0183794 | A1 | 7/2008 | Georgis et al. | |
| 2011/0029666 | A1 | 2/2011 | Lopatecki et al. | |
| 2011/0072449 | A1 | 3/2011 | Ivanyi | |
| 2011/0088053 | A1* | 4/2011 | Lee | H04H 60/59 725/19 |
| 2012/0131013 | A1 | 5/2012 | Hobbs et al. | |
| 2012/0144416 | A1* | 6/2012 | Wetzer | H04N 21/812 725/14 |
| 2012/0278330 | A1* | 11/2012 | Campbell | G06F 16/48 707/740 |
| 2013/0070152 | A1* | 3/2013 | Berkowitz | H04N 21/8126 348/500 |
| 2014/0075463 | A1* | 3/2014 | Kam | H04N 21/25891 725/9 |

FOREIGN PATENT DOCUMENTS

| | | |
|---|---|---|
| CN | 102741842 | 10/2012 |
| CN | 102422317 | 4/2014 |

OTHER PUBLICATIONS

International Search Report and Written Opinion dated Nov. 13, 2014 in International Patent Application No. PCT/US2014/020776.
Notice of Allowance dated Jan. 19, 2021 in U.S. Appl. No. 16/579,609.
Notice of Allowance dated Jun. 5, 2019 in U.S. Appl. No. 13/830,866.
Office Action dated Jan. 14, 2016 in U.S. Appl. No. 13/830,866.
Office Action dated Mar. 22, 2019 in U.S. Appl. No. 13/830,866.
Office Action dated Apr. 23, 2020 in KR Patent Application No. 10-2015-7029446.
Office Action dated May 5, 2016 in U.S. Appl. No. 13/830,866.
Office Action dated May 15, 2017 in CN Patent Application No. 201480026193.6.
Office Action dated Jun. 11, 2015 in U.S. Appl. No. 13/830,866.
Office Action dated Nov. 13, 2020 in U.S. Appl. No. 16/579,609.
Office Action dated Nov. 18, 2016 in U.S. Appl. No. 13/830,866.
Office Action dated Nov. 29, 2018 in U.S. Appl. No. 13/830,866.
Office Action dated Dec. 15, 2017 in CN Patent Application No. 201480026193.6.

* cited by examiner

DETECTING USER INTEREST IN PRESENTED MEDIA ITEMS BY OBSERVING VOLUME CHANGE EVENTS

CROSS-REFERENCE TO RELATED APPLICATIONS

This application is a continuation of U.S. patent application Ser. No. 16/579,609, filed Sep. 23, 2019, which is a continuation of U.S. patent application Ser. No. 13/830,866, filed Mar. 14, 2013, each of which is hereby incorporated by reference herein in its entirety.

TECHNICAL FIELD

The disclosed implementations relate to the field of displaying media content generally and in particular to using volume changes to estimate interest.

BACKGROUND

Consumers have many options for consuming media content. In addition to traditional, non-interactive avenues such traditional television, radio, or projection screens in movie theatres, new electronic devices provide additional avenues for consuming media content, such as streaming content over the Internet via computers, smart phones, or tablets. Some of these additional avenues allow users to interact with the distributors of media content. This increased interaction allows distributors or producers of media content to provide more personalized services to the consumers of the media content.

The increased number of media options available to consumers has resulted in increased competition among of media content providers to attract consumers. In order to compete for available consumers, providers of media content must provide content that is interesting. In order to ensure that media content is interesting, content providers need to be able to measure their consumer's level of interest. Providers of media content can then use the measured level of interest to schedule current content and to produce future content that will of interest to consumers.

Collected user interest information can also be used to personalize provided media content to specific users. For example, a music streaming service can use interest information for a specific user to select the next song to be presented to that user. One option available to producers or distributors of media content for providing personalized services is through a recommendation engine. Such engines select new media content to recommend to the user based on information known about a user. Increasing the amount of information that a recommendation engine has concerning a specific user increases the accuracy of recommendation engine to correctly recommend media content that the user will find interesting. As a result, gathering information concerning what media content a user finds interesting and what media content a user does not find interesting is important to providing a good user experience.

SUMMARY

In In accordance with some implementations, a method for estimating user interest in media content is disclosed. The method is performed on a server system having one or more processors and memory storing one or more programs for execution by the one or more processors. The server system receives a volume change event from a client system. The server system determines identification of a presented media content item currently being presented at the client system. The server system analyzes the received volume change event to determine a level of user interest in the determined media content item.

In accordance with some implementations, a client system for estimating user interest in media content is disclosed. The client system has one or more processors and memory storing one or more programs to be executed by the one or more processors. The one or more programs include instructions for receiving a volume change event from a client system. The one or more programs further include instructions for determining identification of a presented media content item currently being presented at the client system. The one or more programs further include instructions for analyzing the received volume change event to determine a level of user interest in the determined media content item.

In accordance with some implementations, a non-transitory computer readable storage medium storing one or more programs configured for execution by a client system is disclosed. The one or more programs also include instructions for receiving a volume change event from a client system. The one or more programs further include instructions for determining identification of a presented media content item currently being presented at the client system. The one or more programs further include instructions for analyzing the received volume change event to determine a level of user interest in the determined media content item.

In accordance with some implementations, a method for estimating user interest in media content is disclosed. The method is performed on a client system having one or more processors and memory storing one or more programs for execution by the one or more processors. The client system detects a volume change event from a user of the client system for media content presented in the vicinity of the client device. The client system then analyzes the volume change event to determine user interest in the presented media content. The client system then sends the determined level of interest to a server system.

In accordance with some implementations, a client system for estimating user interest in media content is disclosed. The client system has one or more processors and memory storing one or more programs to be executed by the one or more processors. The one or more programs include instructions for detecting a volume change event from a user of the client system for media content presented in the vicinity of the client device. The one or more programs further include instructions for analyzing the volume change event to determine user interest in the presented media content. The one or more programs further include instructions for sending the determined level of interest to a server system.

In accordance with some implementations, a non-transitory computer readable storage medium storing one or more programs configured for execution by a client system is disclosed. The client system has one or more processors and memory storing one or more programs to be executed by the one or more processors. The one or more programs include instructions for detecting a volume change event from a user of the client system for media content presented in the vicinity of the client device. The one or more programs further include instructions for analyzing the volume change event to determine user interest in the presented media content. The one or more programs further include instructions for sending the determined level of interest to a server system.

BRIEF DESCRIPTION OF THE DRAWINGS

Like reference numerals refer to corresponding parts throughout the drawings.

DESCRIPTION OF IMPLEMENTATIONS

Figure 1:
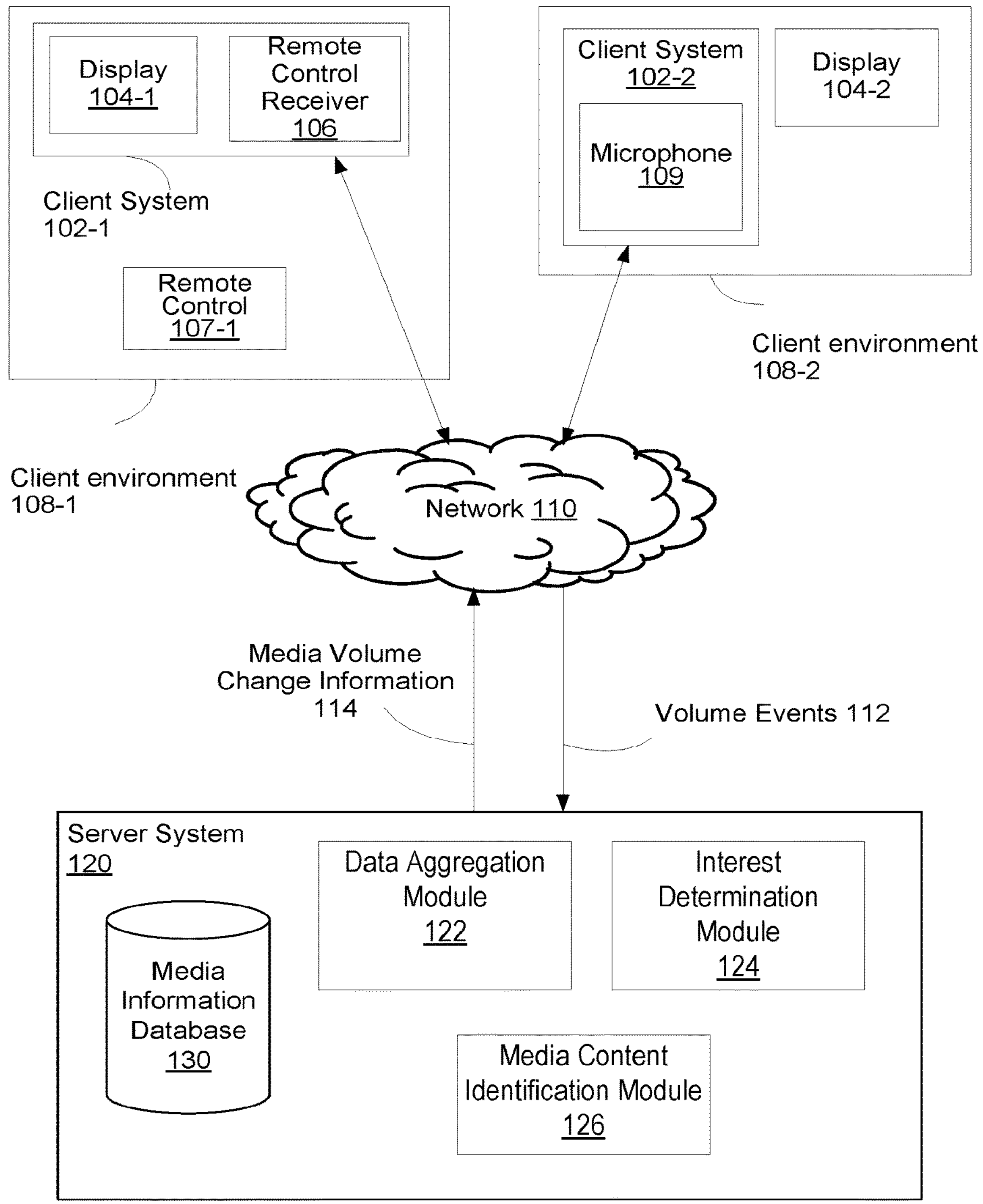
FIG. 1 is a block diagram illustrating a client/server environment including a client system with a display in accordance with some implementations.

In some implementations, a client system presents a media content item on a display in the vicinity of a user of the client system. It is useful for the providers or distributors of the media content item to know whether the media content item is interesting to the viewers or not. Thus, if the users of the client system choose to allow it, the client system attempts to gather information on whether a particular user finds a particular media content item interesting and what parts specifically are interesting. One way the client system is able to help determine user interest is to measure volume change events associated with the media content item. This is based on a presumption that users are more likely to increase volume when they are viewing a program in which they are interested—or—at the very least 13 attending to.

In some implementations the client system detects one of two types of indication of volume change caused by a user. First, the client device can detect a volume change by receiving a volume change command from the user. For example, in some cases, a volume change command issued via a remote controller, such as a traditional remote control or a smart phone, can be detected by the client. The second type is a volume change event. A volume change event is identified by the client device through an actual change in volume when the client device cannot directly receive the volume changes commands. These volume change events can be identified and measured in some implementations by an audio sensor, such as a microphone; e.g., a microphone that is part of a smart phone. In some implementations, the client device reports volume change commands and volume change events to a server system, which then can analyze the volume change information along with information about the media content being currently presented to the user. By evaluating both types of information, as described below, the server is able to determine the interest of the user in the presented media content.

In some implementations, the volume change command is a command that mutes the audio component of the presented media content or ends a previously received mute command. In some implementations a volume change command is a command to incrementally raise or lower the volume at which the media content item is presented. In some implementations, volume up and un-mute commands are interpreted a being s correlated to higher user interest. Volume down or mute events are interpreted as being correlated to lower user interest. For example, if a client system detects a "mute" command soon after the beginning of a commercial, the client system determines that user interest in the displayed commercial is low.

In some implementations, determined user interest can be used to identify important scenes in a film or a television program. For example, scenes in which volume increase commands are detected are identified as being of more interest to a particular user. This data can be captured for a number of users and then correlated. If similar increases in interest are found for the same scene for a significant number of other users (based on the volume change data from those users), then the scene can be determined to be important. In this way, the server system can aggregate data from multiple users and identify the important scenes in a particular film or television program.

As noted above, in some implementations, the client system does not have direct access to the transmitted commands and detects volume change commands through measuring the changes in volume of the presented media content item. For example, in some implementations, the client system includes an audio sensor, such as a microphone, to detect the volume level of the presented media content. For example, a smart phone with a microphone is able to measure the volume of a television show presented on a nearby television. By monitoring the audio levels of the presented television show the client device can detect volume change commands. When the audio levels change (either the expected audio level, the average audio level over a period of time, the maximum audio level, or the instantaneous audio level) the client system registers a volume change event that it can analyze to determine whether it is indicative of user interest or lack thereof.

In some implementations the client system receives media volume information associated with the media content item being presented in the vicinity of the client system from a server system. In some implementations, the server system determines the media content item presented at the client system based on information received from the client system. For example, the client system can transmit metadata associated with the media content item to the server system. In some implementations, the server system is the source of the media content item data as thus determines the specific media content item from its own records. In some implementations, the client system captures an audio or visual fingerprint associated with the media content item and transmits it to the server system. The server system then analyzes the fingerprint or snippet of media content to determine the specific piece of media content. Media volume information includes a listing of volume changes within a media content item. For example, media volume information includes a chronologically ordered list of expected volume changes (i.e. volume changes that exist in the media content item itself). The client system then compares the detected volume change events with the media volume information associated with the presented media content item.

In some implementations, volume change events that do not correlate with expected volume changes identified in the volume information associated with the media content item are determined to be the result of volume change commands issued by a user. For example, when a user is watching the movie "The Avengers" the client device will detect a plurality of volume changes. For each volume change, the client system compares each detected volume change with the media volume information associated with "The Avengers."

The client system detects that the volume of the media content has decreased and determines whether there is a corresponding volume change event in the media volume information associated with the "The Avengers." If so, the client system determines that the user did not issue a volume change command. However, if the media volume information does not have a corresponding volume change, the client system determines that the user issued a volume change command.

In some implementations, volume change events that correlate with expected volume changes are not recorded. For example, the client system uses its microphone to identify the television program currently being presented in proximity to the device (e.g., by audio fingerprinting of the program) and retrieve volume information from a server system. For example, a smart phone device determines that an episode of the television program "The Wire" is currently being displayed in the proximity of the smart phone device. The smart phone device detects an increase in the volume at which the television program is presented at a particular time in the media content item. The smart phone device then determines whether there is a corresponding increase in volume listed in the volume change information for the media content item. For example, the smart phone device detects a significant increase in volume at 15 minutes and 36 seconds into the episode and checks the associated volume change information at the same time. If the volume change information includes a corresponding volume change (the television program includes an increase in volume because of loud music or characters shouting), the client system disregards the volume change event as not indicative of user interest.

FIG. 1 is a block diagram illustrating a client-server environment 100, in accordance with some implementations. The client-server environment 100 includes one or more client environments 108. In some implementations, a client environment 108-1 includes a client system 102-1 and a remote control 107-1. In some implementations, the client system. 102-1 includes a display 104-1 and a remote control receiver 106. In some implementations, the user environment 108-2 includes a client system 102-2 and a display 104-2 associated with the client system 102-2 but not integrated into the client system 102-2. The client system 102-2 includes a microphone 109. The server system 120 includes a data aggregation module 122, an interest determination module 124, and a media information database 130. The server system 120 and the client systems 102 may connect to any of a variety of networks, including local area networks (LAN), wide area networks (WAN), wireless networks, wired networks, the Internet, or a combination of such networks.

In accordance with some implementations, the client environment 108-1 includes a client system 102-1. In some implementations, the client system 102-1 includes an incorporated remote control receiver 106 and an incorporated display 104-1. The incorporated remote control receiver 106 receives a wireless signal from a remote control 107-1 to relay commands from the user (who holds or otherwise interacts with the remote control) to the client system 102-1. The incorporated display 104-1 is included as an integrated part of the client system 102-1 and displays media in the client environment 108-1

In other implementations the client environment 108-2 includes a client system 102-2 and a display 104-2, which is associated with the client system 102-2 but is not integrated into the client system 102-2. The client system 102-2 includes an integrated microphone 109 that is able to detect audio information from the area in the proximity of the client system 102-2. The associated display 104-2 is configured to display media in the vicinity of the user of the client system 102-2.

In accordance with some implementations, the client system 102 receives media volume change information 114 from the server system 120. The media volume change information 114 includes media volume information for one or more pieces of media content. In some implementations, the media volume change information 114 lists expected volume change events and the time in the media content at which they occur. For example, the volume change information 114 for "The Dark Knight" includes times when the volume increases (e.g. when the music increasing in volume, a loud action scene occurs, or characters in the media content yell or speak loudly) and when the volume decreases (e.g. during establishing shots without music or softly spoken dialogue).

In some implementations, the client system 102 sends volume events 112 to the server system 120. The volume events 112 include information identifying the type of volume event (volume up, volume down, mute, and unmute, for example), a time stamp identifying when the volume change event 112 was detected, and a user identification number for identifying the user who issued the command. In some implementations, the client system 102 determines the identity of the presented piece of media content prior to transmitting the volume events 112 to the server system 120. In this implementation, the client system 102 also transmits the media content information that identifies the media content being presented on the display 104.

In some implementations, the client system 102 does not identify the specific piece of media content prior to transmitting the volume events 112 to the server system 120. Instead, the client system 102 also transmits channel information, location information for the client device, or audio fingerprint information to the server system 120 that the server system 120 then uses to identify the specific piece of media content currently presented at the client system 102. In some implementations, the client system 102 uses a microphone 109 to collect actual audio snippets from the presented media content item and then transmits the collected audio snippets to the server system 120 for identification. For example, a smart phone uses its microphone to record a 30 second clip of audio data from a media content item currently being displayed in the vicinity of the smart phone and transmits at least a portion of that 30 second clip to the server system 120. The server system then uses that audio data to determine that the currently presented media content item is the film "The Dark Knight Rises." The server system 120 then sends back the volume change information 114 associated with "The Dark Knight Rises" to the client system 102 along with an indication the approximate time within the "The Dark Knight Rises" that the snippet came from. Thus allowing the client system 102 to establish which part of the Dark Knight Rises is currently being displayed and to begin to compare volume changes to the corresponding time in the volume change information 114.

In accordance with some implementations, the server system 120 includes a data aggregation module 122, an interest determination module 124, a media content identification module 126, and a media information database 130. The data aggregation module 122 is configured to collect volume change command and event information 112 from any client system 102 with a user who expressly authorizes the server system 120 to collect such information. The data aggregation module 122 collects this information from a plurality of client systems 102 and groups the volume information by the media content item to which it applies. For example, when a new episode of a popular television program airs on a widely seen television network, such as a new episode of "NCIS" on CBS, it is likely that the server system 120 will receive volume change events or volume change commands from a plurality of users for this same television program. The data aggregation module groups all of this data for comparison. By comparing volume change events 112 from a plurality of users, the server system 120 can identify volume change events 112 that occur in all the client systems 102 and thus discount those volume change events 112 as occurring in the media content itself and not as the result of a user command.

In some implementations, the data aggregation module 122 also receives volume change commands from client systems 102 associated with users who have authorized the server system to collect the volume change commands. The data aggregation module 122 compares volume change commands for a particular piece of media content across multiple client systems 102. The server system 102 then passes this aggregated volume change information to the interest determination module 124

In some implementations, the interest determination module 124 receives aggregated volume change information from the data aggregation module 122. The interest determination module 124 then uses this information to determine user interest in particular media content items or particular portions within a single of media content item. In some implementations, volume down commands and mute commands are determined to indicate that users are less interested or not interested in the piece of media content presented at the time of the command. If the volume change command occurs in only a small minority of users, the information is either disregarded as coincidental (i.e. the volume change command was not related to the user's interest in the media content item) or stored solely in the user profile of the users who issued the commands. However, if the volume down command is detected in a larger minority or majority of cases, the interest determination module 124 determines that users generally are not interested in the media content item being displayed, find it annoying, or find it to be presented too loudly. For example, a particular commercial may include annoying sounds or music that result in most or all users entering a mute command or a volume decrease command. In some implementations, a media content item, such as a commercial, is presented at a higher volume level than the media content item presented immediately prior and thus results in many users performing nearly simultaneous volume down commands.

In some implementations, the interest determination module determines that the received volume change command indicates increased user interest. In some implementations, increase volume commands and un-mute commands indicate that a user is interested in the particular piece of media content or a particular piece of a larger piece of media content (i.e. a particular scene in a television program or movie). If the volume increase command occurs in only a small minority of users, the information is either disregarded as not representative of user interest generally, or stored solely in the user profile of the users who issued the commands. However, if the volume increase command is detected in a larger minority or majority of cases, the interest determination module 124 determines that users generally are interested in the media content item being displayed.

In some implementations, the interest determination module 124 stores determined user interest information for later use. For example, the server system 120 uses this information when recommending pieces of media content to users. Media content that is generally found interesting by users is more likely to be recommended or displayed (in the case of advertising), while media content that is generally not found interesting is less likely to be recommended or displayed. In some implementations, a user is able to choose whether to allow media content personalization such that their particular interests are recorded in an associated user profile. The server system 120 then uses the user profile to select piece of media content for display or recommendation in the future. For example, if a particular user always mutes car commercials but turns up the volume for commercials involving video games, the server system 120 is more likely to display a video game commercial to the user and is less likely to display a car commercial.

In some implementations, the server system 120 collects statistics and gives feedback to producers or distributors of media content. The producers and distributors of media content can then use this information to improve the quality of the media content they produce. For example, if the server system 120 determines that users generally issue mute or volume down commands when a particular character in a television program comes on screen, the producers of the television program can use this information to cut down the character's screen time or to rewrite the character to be more interesting. In another example, when the interest determination module 124 determines that users generally issue a mute command when a particular commercial comes on, the producers or distributors of that commercial can use that information to make the commercial less annoying or to remove the commercial from broadcast to be replaced by a more interesting commercial.

In some implementations, the media content identification module 126 receives volume event information 112 from a client system 102. In some implementations, the volume event information 112 does not include information identifying the specific piece of media content current being presented at the client system 102. In this case, the media content identification module 126 determines the identity of the specific piece of media content. In some implementations, the received volume event information includes time, channel, and location information for the displayed media content. Using this information the media content identification module 126 is able to use scheduling information in the media information database 130 to identify the presented media content.

In some implementations, the media content identification module 126 receives a snippet of audio from the media content from a client system 102, or one or more audio fingerprints from a client system 102 that were generated by the client system from the media content. The media content identification module 126 then analyzes the audio snippet or fingerprints to identify a match to a specific piece of media content. The media content identification module 126 can use a database of stored audio information for this purpose. Once the specific media content item is identified the media content identification module 126 transmits the identity of the specific piece of media content to the client system 102. In some implementations, the media content identification module 126 also transmits the approximate time within the piece of media content at which the snippet occurred, thus allowing the client system 102 identify which part of the media content item is currently being displayed.

In accordance with some implementations, the media information database 130 includes specific details about specific pieces of media content. For example, the media information database 130 includes the genre information, cast information, director information, event information, and other information related to specific media. The server system 120 uses this information to facilitate evaluation of potential recommendations. In some implementations, the media information database 130 also stores media volume change information 114 for specific media content items. This information is transmitted to client systems 102 when requested.

Figure 2:
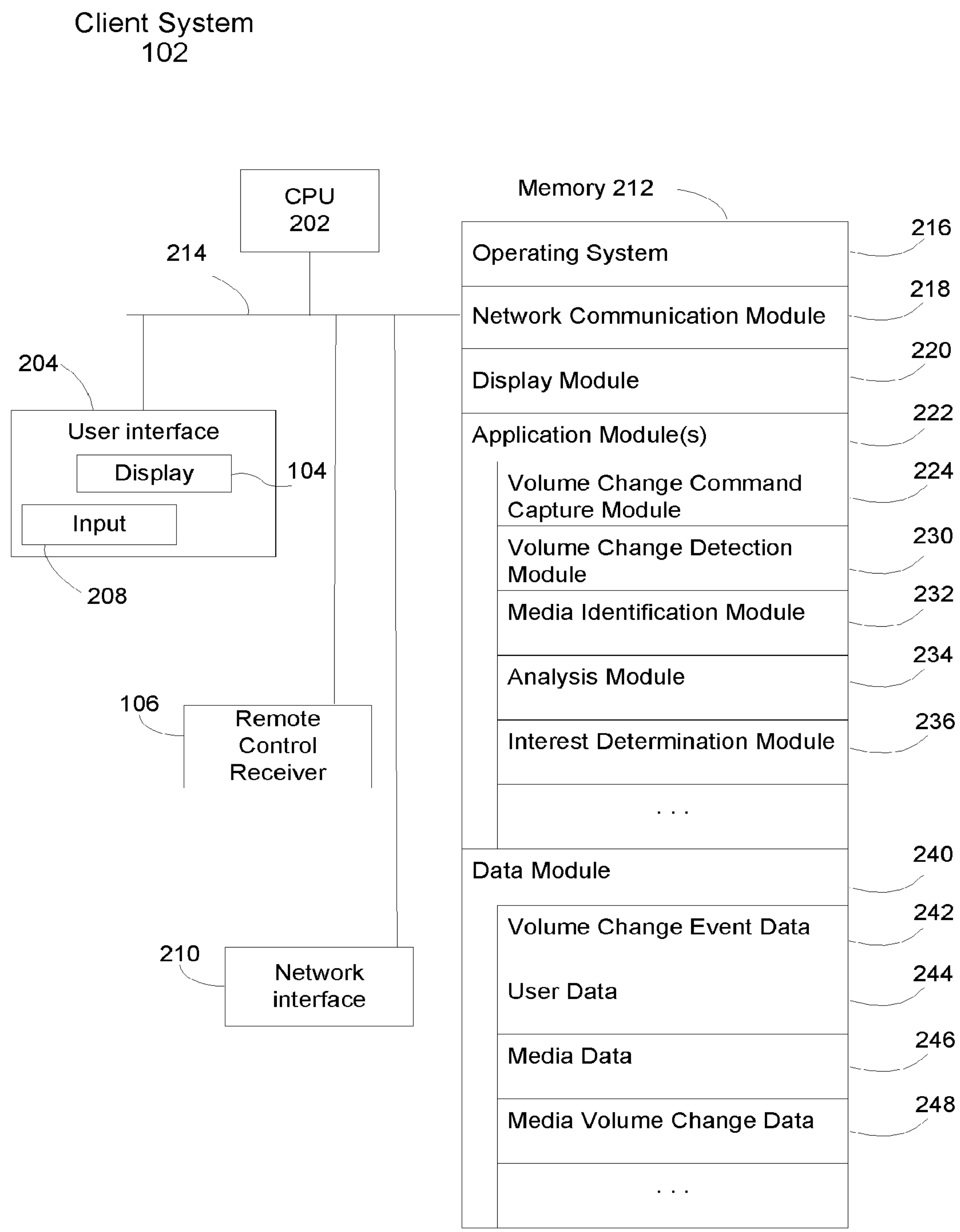
FIG. 2 is a block diagram illustrating a client system in accordance with some implementations.

FIG. 2 is a block diagram illustrating a client system 102, in accordance with some implementations. The client system 102 includes one or more processing units (CPU's) 202, one or more network interfaces 210, memory 212, a remote control receiver 106, and one or more communication buses 214 for interconnecting these components. The client system 102 includes a user interface 204. The user interface 204 includes an associated display device 104 and optionally includes an input means such as a keyboard, mouse, a touch sensitive display, a microphone, or other input buttons 208. Optionally, the display device 104 includes an audio device or other information delivery device. Furthermore, some client systems use a microphone and voice recognition to supplement or replace the keyboard.

Memory 212 includes high-speed random access memory, such as DRAM, SRAM, or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

an operating system 216 that includes procedures for handling various basic system services and for performing hardware dependent tasks;

a network communication module 218 that is used for connecting the client system 102 to other computers via the one or more communication network interfaces 210 (wired or wireless) and one or more communication networks, such as the Internet, other wide area networks, local area networks, metropolitan area networks, and so on;

a display module 220 for enabling display of media content on a display 104 associated with the client system 102;

one or more client system 102 applications module(s) 222 for enabling the client system 102 to perform the functions offered by the client system 102, including but not limited to:

- a volume change command capture module 224 for monitoring the remote control receiver 106 for volume change commands and, when a volume change command is detected, recording the type of command and the time the command was issued;
- a volume change detection module 230 for, when direct volume change commands are not available, monitoring the volume levels of media presented in the vicinity of the client system 102 and detecting when the volume levels change;
- a media identification module 232 for determining the identity of media content displayed at or near the client system 102 by analyzing the metadata transmitted with the media content, analyzing the date, time, location, and channel information associated with the piece of media content, analyzing audio fingerprints within the media content, or transmitting information to a server system 120 and receiving identification from the server system 120;
- an analysis module 234 for comparing detected volume changes from the volume change detection module 230 to the media volume change data 246 for the presented media information to determine whether the volume changes are the result of volume change commands originating at a user or volume changes within the media itself; and
- an interest determination module 236 for determining the interest a user in the vicinity of the client system 102 in media currently being displayed on the display 104 associated with the client system 102 by gathering volume change commands and/or volume change events and establishing whether they are indicative of user interest or lack of user interest; and a data module 240 for storing data related to the client system 102, including but not limited to:

- volume change event data 242 including data collected from volume change commands and volume change events;
- user data 244 including information concerning users of the client system 102 such as a user profile, user preferences and interests, and other information relevant to effectively providing services to the user;
- media data 246 including data necessary to present media content at the client device and any information identifying the piece of media content currently displayed, and including captured audio or visual snippets or fingerprints; and
- media volume change data 248 including data representing the changes in volume included in the media that is currently displayed or will be soon be displayed on the display 104 associated with the client system 102.

Figure 3:
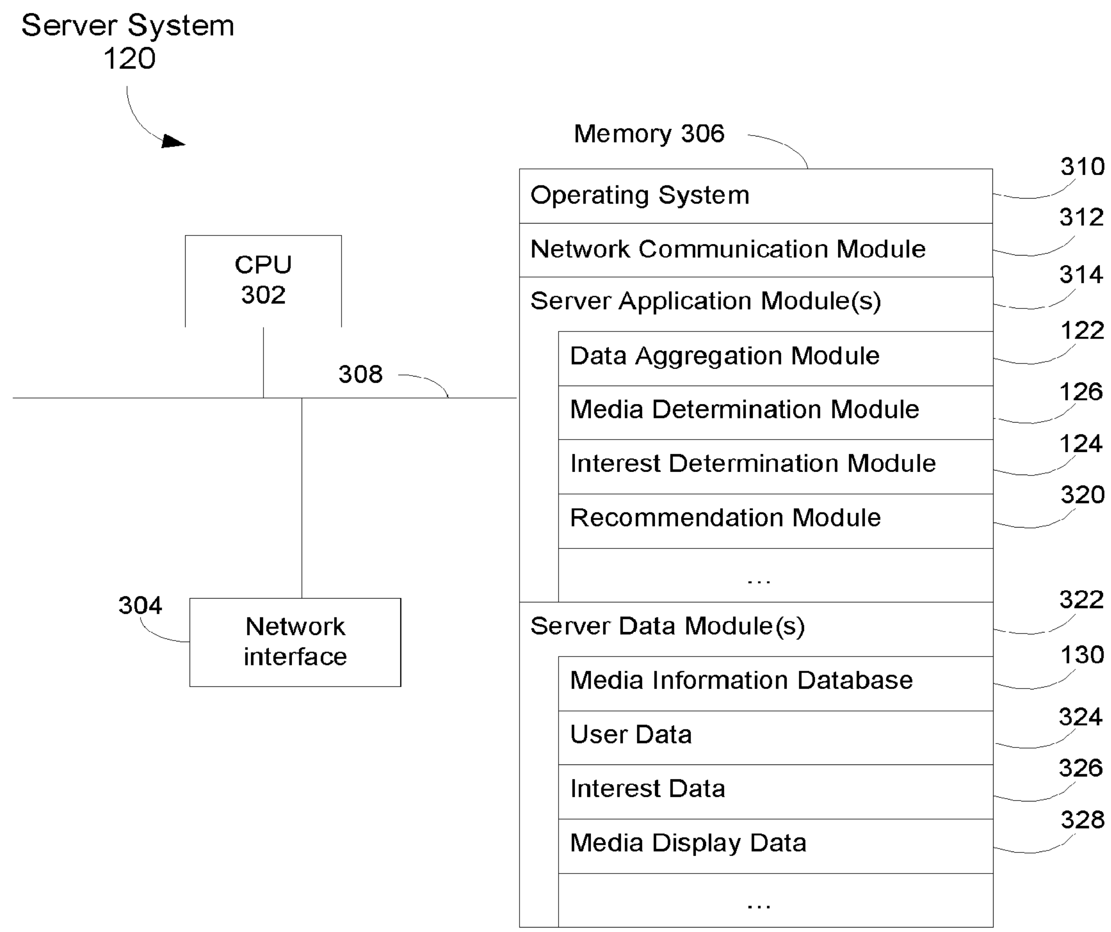
FIG. 3 is a block diagram illustrating a server system in accordance with some implementations.

FIG. 3 is a block diagram illustrating a server system 120, in accordance with some implementations. The server system 120 typically includes one or more processing units (CPU's) 302, one or more network interfaces 304, memory 306, and one or more communication buses 308 for interconnecting these components.

Memory 306 includes high-speed random access memory, such as DRAM, SRAM DDR RAM or other random access solid state memory devices; and may include nonvolatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

an operating system 310 that includes procedures for handling various basic system services and for performing hardware dependent tasks;

a network communication module 312 that is used for connecting the server system 120 to other computers via the one or more communication network interfaces 304 (wired or wireless) and one or more communication networks, such as the Internet, other wide area networks, local area networks, metropolitan area networks, and so on;

one or more server application module(s) 314 for enabling the server system 120 to perform the functions offered by the server system 120, including but not limited to:

- a data aggregation module 122 for collecting volume change information from a plurality of client systems (FIG. 1, 102), grouping information by the specific piece of media content to which they relate, and grouping volume change events by the time at which they occurred to develop generalized information as to what content caused the users to increase the volume (or un-mute) of the presented piece of media content and what content caused users to decrease the volume (or mute) of the presented media content item;
- a media determination module 126 for determining the media being presented at a client system (FIG. 1, 102), wherein the media being displayed at a client system (FIG. 1, 102) is determined by receiving the identification of the media from the client system (FIG. 1, 102), analyzing the data being presented on the display (FIG. 1, 104) associated with the client system (FIG. 1, 102), or, in the case where the media displayed at the client system (FIG. 1, 102) is being provided by the server system 120, determining the media being transmitted to the client system (FIG. 1, 102);
- an interest determination module 124 for determining whether a given volume event or set of events indicates increased interest, decreased interest, or no change in interest at all; and
- a recommendation module 320 for determining media content items to recommend to a user based on the user profile associated with user, the user's history, and interest information associated with pieces of media content; and one or more server data module(s) 322 for storing data related to the server system 120, including but not limited to:

- media information database 130 including specific details about particular pieces of media, including, for example, the genre information, cast information, director information, event information, volume change information, and other information related to specific media;
- user data 324 including information concerning users of the client system (FIG. 1, 102) such as a user profile, user preferences and interests, previously collected volume change information, demographic information, and other information relevant to effectively providing services to the user;
- interest data 326 including data received from the client system (FIG. 1, 102) that indicates the level of interest a user has for one or more pieces of media content; and
- media display data 328 including data that when provided by the server system 120 to the client system (FIG. 1, 102) enables the client system to present the associate media content and including audio and visual data, snippets and fingerprints.

Figure 4:
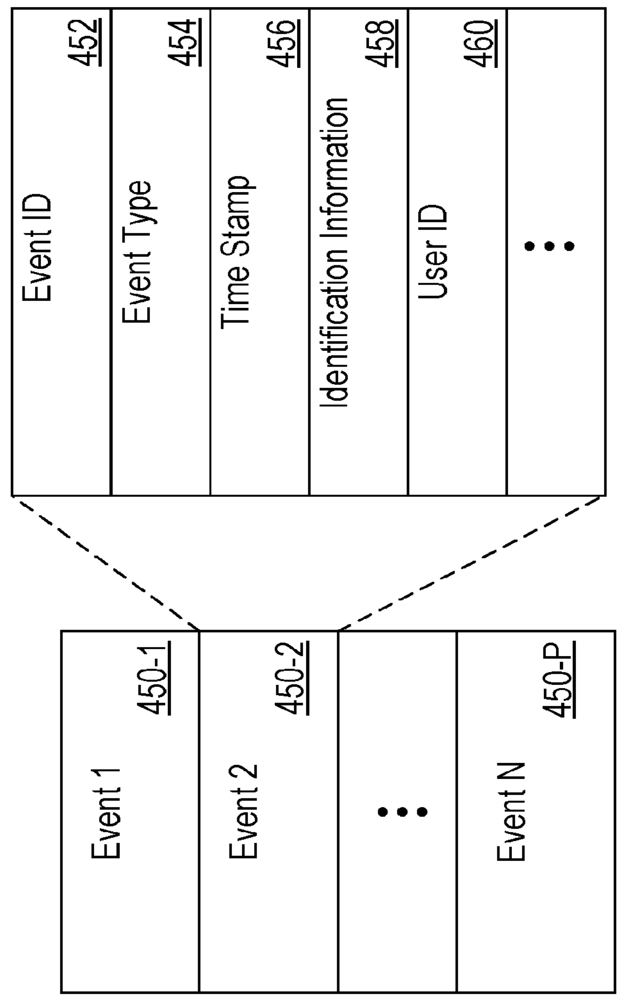
FIG. 4 is a block diagram of a volume event data 248 stored at a client system and transmitted to a server system in accordance with some implementations.

FIG. 4 is a block diagram of a volume event data 248 stored at a client system (FIG. 1, 102) and transmitted to a server system (FIG. 1, 120) in accordance with some implementations. Volume event data includes a list of events (450-1 through 450-P). Each event represents a specific volume change command or a detected volume change that occurs during the presentation of a specific piece of media content.

In some implementations, an event 450 includes additional information concerning the event. In some implementations each event includes one or more of: an event ID 452, an event type 454, a time stamp 456, identification information 458, and user identification information 460. The event ID uniquely identifies the event to both the client system (FIG. 1, 102) and the server system (FIG. 1, 120). The event type 454 identifies the type of volume event that occurred. In some implementations, there are four possible types of volume events: 1) Volume up, 2) Volume down, 3) Mute, and 4) Un-mute. In some implementations, the event type 454 distinguishes between large volume increases/decreases and small volume increases/decreases.

In some implementations, the time stamp 256 includes information identifying when a volume change command or volume change event occurred. In some implementations the recorded time stamp 256 is absolute and refers to a date and time. For example, the time stamp may record Nov. 12, 2012 at 9:54:43 AM as the time. In other implementations, the recorded time stamp 256 is a measurement of time, relative to the beginning of the currently presented piece of media content. For example, the time stamp reads 1:24:32, indicating that the current time is 1 hour, 24 minutes and 32 seconds since the beginning of the currently presented media content item.

In some implementations, the identification information 458 includes information used to identify the specific media content item currently being displayed. In some implementations, the identification information 458 includes a media content identifier that explicitly identifies the media content. In other implementations, the identification information 458 includes time, location, date, and channel information that can be used to identify a specific television program. In some implementations, the identification information 458 includes audio data (such as a raw audio snippet or an audio fingerprint) that was recorded from presented media and can be used to identify the specific piece of media content.

In some implementations, the event data 450 includes user identification information 460. In some implementations, user identification information 460 includes a unique user ID that identifies a specific user and their associated user profile. In some implementations, the user identification information 460 has been stripped of any personally identifiable information and only includes demographic information associated with the user such as age, gender, race, location, and language, among other potential demographic information. No user identification information 460 will be collected from a user without express permission.

Figure 5:
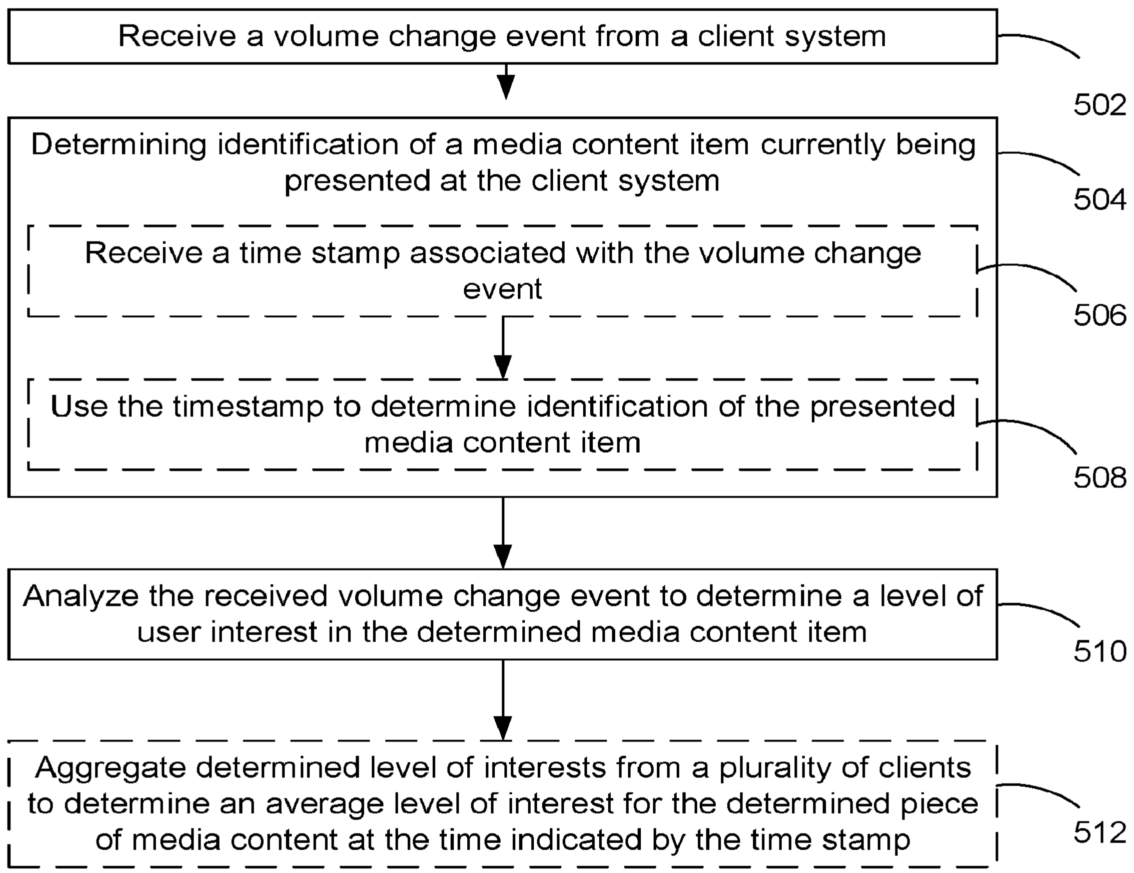
FIG. 5 is a flow diagram illustrating the process of detecting user interest based on volume change events, in accordance with some implementations.

FIG. 5 is a flow diagram illustrating the process of detecting user interest based on volume change commands, in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the server system (FIG. 1, 120).

In accordance with some implementations, the server system (FIG. 1, 120) receives, from a client system (FIG. 1, 102), a volume change command (502). For example, the server system (FIG. 1, 120) receives a "mute" command indication from the client system (FIG. 1, 102), indicating that the client system has received a "mute" command from a user. In some implementations, the server system (FIG. 1, 120) determines the identity of a media content item currently being presented at the client system (FIG. 1, 102) (504).

In some implementations, the server system (FIG. 1, 120) determines the identity of the presented media content item by receiving a time stamp associated with the volume change command (506). The server system (FIG. 1, 120)

uses the timestamp to determine identification of the presented media content item (508). For example, using the timestamp, the server system (FIG. 1, 120) can use programming or schedule information, in combination with location and channel information from the user to identify a specific media content item presented at a specific time.

In some implementations, the server system (FIG. 1, 120) analyzes the received volume change event to determine a level of user interest in the determined media content item (510). For example, a mute command is determined to show lack of user interest in the currently presented media and a volume up command is determined to show increased user interest in the currently presented media. The server system (FIG. 1, 120) aggregates the determined levels of interest from a plurality of clients to determine an average level of interest for the determined media content item at the time indicated by the timestamp (512). In this way the server system (FIG. 1, 120) can filter out volume change events or commands that are not related to user interest (the user got a phone call or had background noise). If a pattern of volume change commands or events can be detected across a plurality of users all viewing the same media content item, it is more likely that the volume change is related to user interest.

Figure 6:
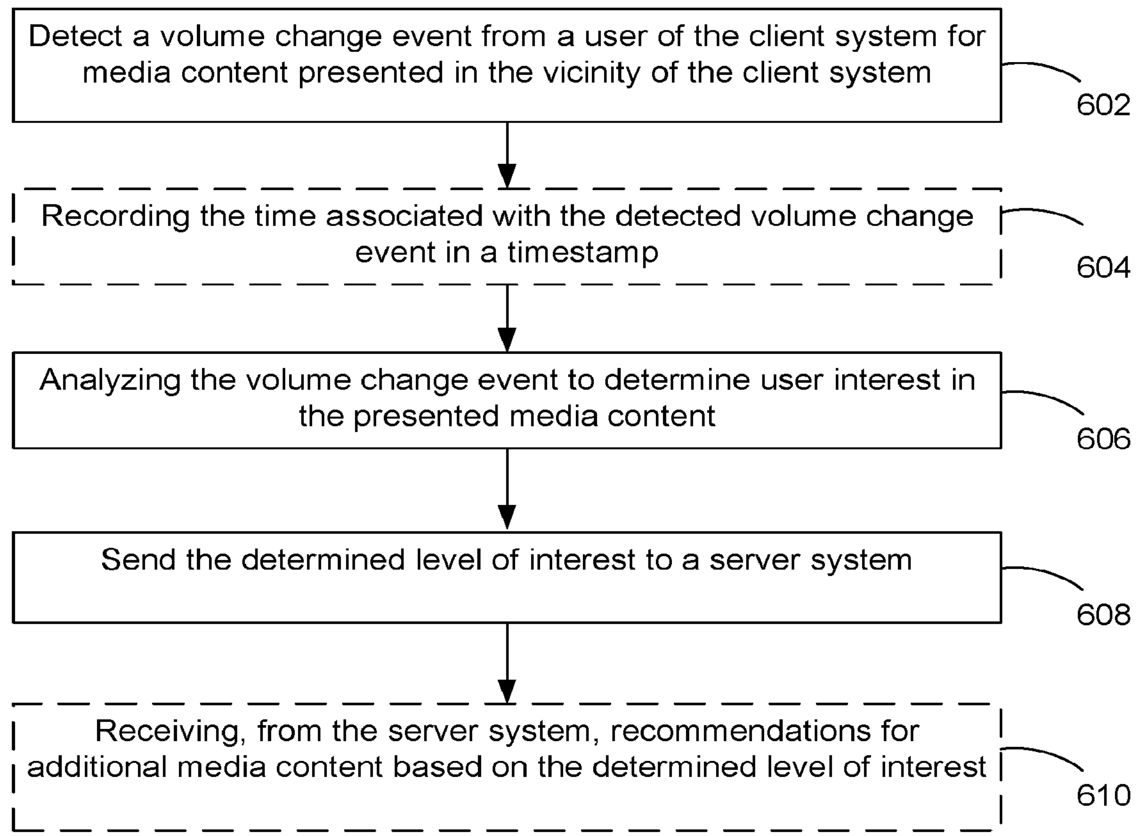
FIG. 6 is a flow diagram illustrating the process of estimating user interest in media content, in accordance with some implementations.

FIG. 6 is a flow diagram illustrating the process of estimating user interest in media content, in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the client system (FIG. 1, 102).

In accordance with some implementations, the client system (FIG. 1, 102) detects a volume change event from a user of the client system for media content presented in the vicinity of the client system (602). For example, the client system (FIG. 1, 102) is a smart phone with a microphone. The microphone, with the user's permission, is monitoring the volume levels of a media content item presented in the vicinity of the smart phone. When the smart phone detects a change in the volume level, it makes a record of the volume change and attempts to determine whether the volume change event is the result of a user action or the result of the media content.

In accordance with some implementations, the client system (FIG. 1, 102) analyzes the volume change event to determine user interest in the presented media content (606). As noted above, volume increase events indicate an increase in user interest while volume decrease or mute events indicate low or no user interest. The client system (FIG. 1, 102) sends the determined level of user interest to a server system (FIG. 1, 120) (608).

In accordance with some implementations, the client system (FIG. 1, 102) receives recommendations for additional media content based on the determined level of interest (610). For example, if the user is watching web based videos, additional videos are recommended after the current video is completed. These recommendations are selected based, at least in part, on volume change information collected from the user of the client system (FIG. 1, 102) if the user has consented.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for recommending media content, the method comprising:

at an electronic device having a microphone, one or more processors, and memory storing one or more programs for execution by the one or more processors:

detecting a volume change event within monitored audible output for media content being presented;

determining whether the detected volume change event correlates with one or more expected volume change events within the media content;

in response to determining that the detected volume change event does not correlate with the one or more expected volume change events within the media content, determining a level of user interest in the media content based on the detected volume change event, wherein a decrease in volume is indicative of a lower level of user interest; and causing at least one content recommendation to be presented based on the determined level of user interest in the media content.

2. The method of claim 1, further comprising monitoring, via the microphone, the audible output for the media content being presented in the vicinity of the electronic device.

3. The method of claim 1, further comprising:
identifying the media content; and
obtaining a list of the one or more expected volume change events within the media content based on the identified media content.

4. The method of claim 1, further comprising:
transmitting the determined level of interest to a server system; and
receiving, from the server system, the at least one content recommendation based on the determined level of interest.

5. The method of claim 1, further comprising recording the time associated with the detected volume change event in a timestamp.

6. The method of claim 1, wherein detecting the volume change event comprises detecting an audio mute event.

7. The method of claim 1, further comprising obtaining an identification of the media content from a server system.

8. The method of claim 7, wherein the obtaining the identification of the media content comprises utilizing at least one of an audio fingerprint, a visual fingerprint, metadata associated with the media content, and a media content database.

9. The method of claim 1, further comprising receiving, from a server system, a plurality of content recommendations based on the determined level of interest that includes receiving, from the server system, one or more recommendations for additional media content.

10. The method of claim 1, further comprising filtering out volume change events or commands that are not related to user interest based on aggregation by a server system of determined levels of interest transmitted to the server system by a plurality of client devices for the identified media content.

11. An electronic device for recommending media content, comprising:
a microphone;
one or more processors;
memory storing one or more programs to be executed by the one or more processors;
the one or more programs comprising instructions for:
detecting a volume change event within monitored audible output for media content being presented;
determining whether the detected volume change event correlates with one or more expected volume change events within the media content;
in response to determining that the detected volume change event does not correlate with the one or more expected volume change events within the media content, determining a level of user interest in the media content based on the detected volume change event, wherein a decrease in volume is indicative of a lower level of user interest; and
causing at least one content recommendation to be presented based on the determined level of user interest in the media content.

12. The electronic device of claim 11, the one or more programs further comprising instructions for monitoring, via the microphone, the audible output for the media content being presented in the vicinity of the electronic device.

13. The electronic device of claim 11, the one or more programs further comprising instructions for:
identifying the media content; and
obtaining a list of the one or more expected volume change events within the media content based on the identified media content.

14. The electronic device of claim 11, the one or more programs further comprising instructions for:
transmitting the determined level of interest to a server system; and
receiving, from the server system, the at least one content recommendation based on the determined level of interest.

15. The electronic device of claim 11, the one or more programs further comprising instructions for recording the time associated with the detected volume change event in a timestamp.

16. The electronic device of claim 11, wherein detecting the volume change event comprises detecting an audio mute event.

17. The electronic device of claim 11, the one or more programs further comprising instructions for obtaining an identification of the media content from a server system.

18. The electronic device of claim 17, wherein the obtaining the identification of the media content comprises utilizing at least one of an audio fingerprint, a visual fingerprint, metadata associated with the media content, and a media content database.

19. The electronic device of claim 11, the one or more programs further comprising instructions for receiving, from a server system, a plurality of content recommendations based on the determined level of interest that includes receiving, from the server system, one or more recommendations for additional media content.

20. The electronic device of claim 11, the one or more programs further comprising instructions for filtering out volume change events or commands that are not related to user interest based on aggregation by a server system of determined levels of interest transmitted to the server system by a plurality of client devices for the identified media content.

21. A non-transitory computer readable storage medium storing one or more programs configured for execution by an electronic device with a microphone, the one or more programs comprising instructions for:
detecting a volume change event within monitored audible output for media content being presented;
determining whether the detected volume change event correlates with one or more expected volume change events within the media content;
in response to determining that the detected volume change event does not correlate with the one or more expected volume change events within the media content, determining a level of user interest in the media content based on the detected volume change event, wherein a decrease in volume is indicative of a lower level of user interest; and
causing at least one content recommendation to be presented based on the determined level of user interest in the media content.

* * * * *